US005520079A

United States Patent [19]
Maejima et al.

[11] Patent Number: 5,520,079
[45] Date of Patent: May 28, 1996

[54] TERMINAL CARRIER CHIPPER

[75] Inventors: Takamichi Maejima; Kazuhiko Takada, both of Shizuoka, Japan

[73] Assignee: Yazaki Corporation, Tokyo, Japan

[21] Appl. No.: 111,953

[22] Filed: Aug. 26, 1993

[30] Foreign Application Priority Data

Aug. 31, 1992 [JP] Japan .................................. 4-231919

[51] Int. Cl.⁶ .............................. B26D 5/16; B26D 1/30
[52] U.S. Cl. .............................. 83/602; 83/580; 83/607; 83/955
[58] Field of Search ............................ 83/602, 607, 608, 83/955, 628, 580

[56] References Cited

U.S. PATENT DOCUMENTS

| | | | |
|---|---|---|---|
| 499,650 | 1/1893 | Breitenbach | 83/608 |
| 981,166 | 1/1911 | Cheney | 83/602 |
| 1,082,629 | 12/1913 | Hadaway | 83/608 X |
| 2,870,837 | 1/1959 | Rosenberg | 83/602 X |
| 4,241,631 | 12/1980 | Salvatore | 83/608 X |
| 5,140,882 | 8/1992 | Hyder | 83/955 X |

FOREIGN PATENT DOCUMENTS 57-7846  2/1982  Japan .

*Primary Examiner*—Kenneth E. Peterson
*Attorney, Agent, or Firm*—Sughrue, Mion, Zinn, Macpeak & Seas

[57] ABSTRACT

The invention relates to a terminal carrier chipper for chipping a terminal carrier that couples a plurality of terminals in concatenation during the process of fabricating a wire harness used in electrical circuits. The object of the invention is to provide a terminal carrier chipper in simple structure, which is less vibrating and noisy and whose blade section exhibits an improved durability. The terminal carrier chipper according to the present invention includes: a fixed blade 3; a moving blade lever 9; and a rotating cam 5. The moving blade lever 9 is oscillated around a support shaft 10 by rotating the cam 5 while causing a projection 5a of the cam 5 to come in contact with a cam guide 11 arranged on the moving blade lever, so that a blade edge 9c of the moving blade lever nears and leaves a blade edge 3a of the fixed blade 3 to thereby chip a terminal carrier T.

5 Claims, 3 Drawing Sheets

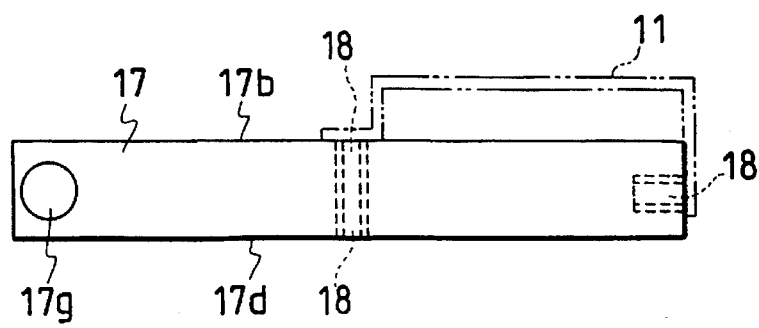
FIG. 7
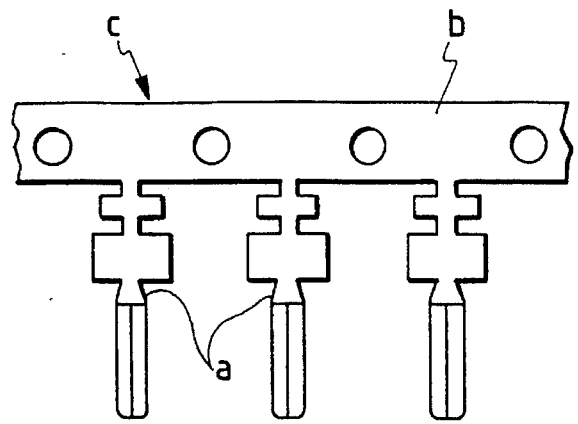
FIG. 8
FIG. 9
PRIOR ART
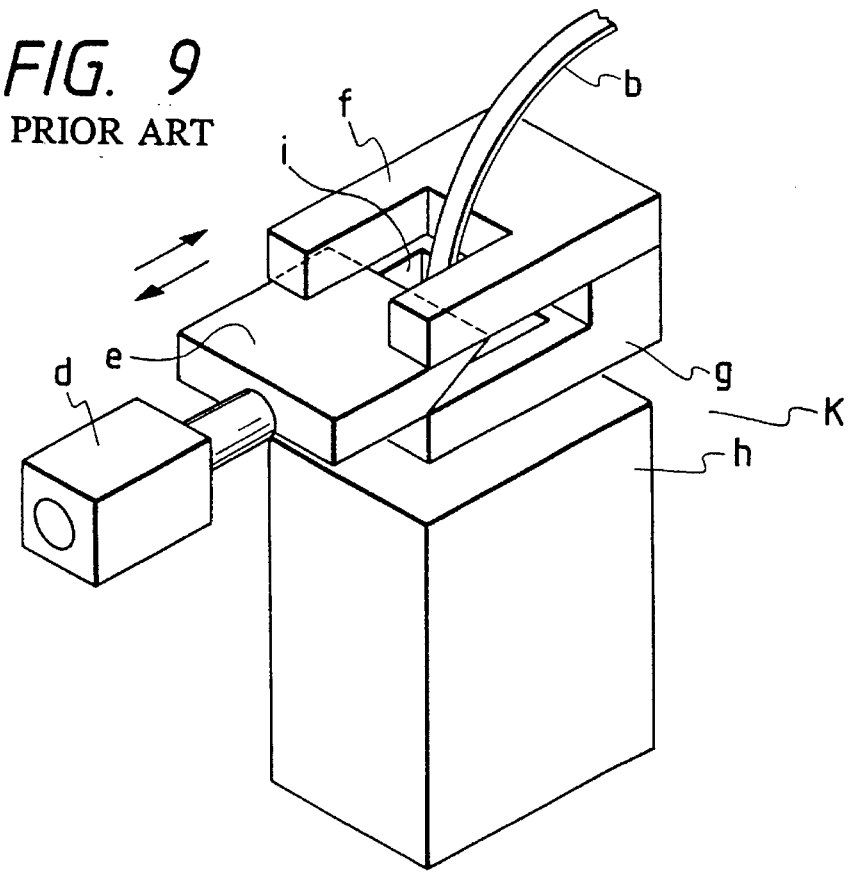

TERMINAL CARRIER CHIPPER

The priority application No. 4-231919, filed in Japan on Aug. 31, 1992, is hereby incorporated by reference.

BACKGROUND OF THE INVENTION

The invention relates to a terminal carrier chipper for chipping a terminal carrier that couples a plurality of terminals in concatenation during the process of fabricating a wire harness used in electrical circuits.

In fabricating a wire harness, the process of connecting a conductor to a terminal involves the pressing of a beltlike metal plate as shown in FIG. 8. More specifically, a concatenated terminal "c" in which a plurality of terminals "a" are coupled to a terminal carrier "b" at a predetermined interval is formed, and conductors are connected to the respective terminals "a" continuously while supplying the concatenated terminal "c" during the process of crimping the respective terminals with the conductors. Therefore, the terminals "a" are separated from the terminal carrier "b", and at the same time, the terminal carrier "b" is cut every terminal "a" and the cut terminal carrier is discharged.

The terminal carrier chipper is a device for chipping the terminal carrier "b" from which the terminals "a" have been separated. Conventionally, in order to prevent the chipped terminal carrier "b" from scattering, the terminal carrier "b" is taken out while in beltlike form, i.e., without being cut into individual chips during the process of crimping terminals "a" with conductors, and such terminal carrier "b" is chipped and collected using a terminal carrier chipper K such as shown in FIG. 9 at a separate place.

The terminal chipper K includes: a sliding blade drive section "d" that is reciprocated by a solenoid or a hydraulic cylinder; a sliding blade "e" coupled to the sliding blade drive section "d"; an inverted C-shaped fixed blade "f"; and a sliding guide plate "g". A chip box "h" is provided below the sliding guide plate "g" so that chips into which the terminal carrier "b" has been transformed can be collected therein.

The terminal carrier "b" is supplied to a square hole "i" defined by the inverted C-shaped fixed blade f and the sliding blade "e". The terminal carrier "b" is chipped by reciprocating the sliding blade "e" in directions indicated by arrows by the sliding blade drive section "d".

When the sliding blade "e" of the terminal carrier chipper K is driven, the chipper K is subjected to such vibration and noise as to move the chipper due to large differences between on-load and no-load conditions. The use of a solenoid is also disadvantageous in that timers and relays are involved in electrical circuits and that electrical noise may affect the surroundings.

SUMMARY OF THE INVENTION

The invention has been made in view of the above circumstances. Accordingly, the object of the invention is to provide a terminal carrier chipper which is simple in structure, which produces less vibration and noise, and which ensures an improved durability of the blade section.

To achieve the above object, the invention is applied to a terminal carrier chipper that includes: a fixed blade, a moving blade lever oscillating around a support shaft and a rotating cam. The moving blade lever being oscillated by rotating the cam while causing the cam to come in contact with a cam guide arranged on the moving blade lever, so that a blade edge of the moving blade lever nears and leaves the fixed blade.

As recited in claim 2, it is preferable that the support shaft of the moving blade lever be mounted on a moving blade lever support stand that is movable relative to the fixed blade.

Further, as recited in claim 3 or 4, it is preferable that the blade edge of the moving blade lever be arranged at a corner formed by both side surfaces interposing a shaft hole of the moving blade lever.

The invention is characterized as causing the blade edge of the moving blade lever to near and leave the fixed blade while oscillating the moving blade lever around the support shaft in association with the rotation of the cam, thereby allowing a terminal carrier introduced between the blade edge of the moving blade lever and the fixed blade to be chipped intermittently by the oscillation of the moving blade lever. Therefore, the terminal carrier chipper of the invention can be small and simple in structure and of less vibrating and noisy, unlike the conventional example in which the moving blade is reciprocated.

The terminal carrier chipper of the invention is further characterized as mounting the support shaft of the moving blade lever on the moving blade lever support stand that is movable relative to the fixed blade, thereby allowing the position at which the blade edge of the moving blade lever nears and leaves the fixed blade can be changed at any time. Therefore, the entire part of the blade edge of the moving blade lever can be used effectively, which contributes to ensuring an extremely improved life of the blade edge of the moving blade lever.

The terminal carrier chipper of the invention is still further characterized as arranging a second similar blade edge on a side opposite to the side on which the first blade edge of the moving blade lever has been arranged, thereby allowing the second blade edge to be used by inverting the moving blade lever when the first blade edge has been worn. Therefore, an improved durability of the blade edge can be ensured, and replacement and maintenance of the blade edges can be facilitated as well.

BRIEF DESCRIPTION OF THE DRAWINGS

FIG. 7 is a plan view of the moving blade lever of FIG. 6;

FIG. 8 is a plan view of a terminal carrier; and

FIG. 9 is a perspective view of a conventional terminal carrier.

DETAILED DESCRIPTION OF THE PREFERRED EMBODIMENTS

Figure 1:
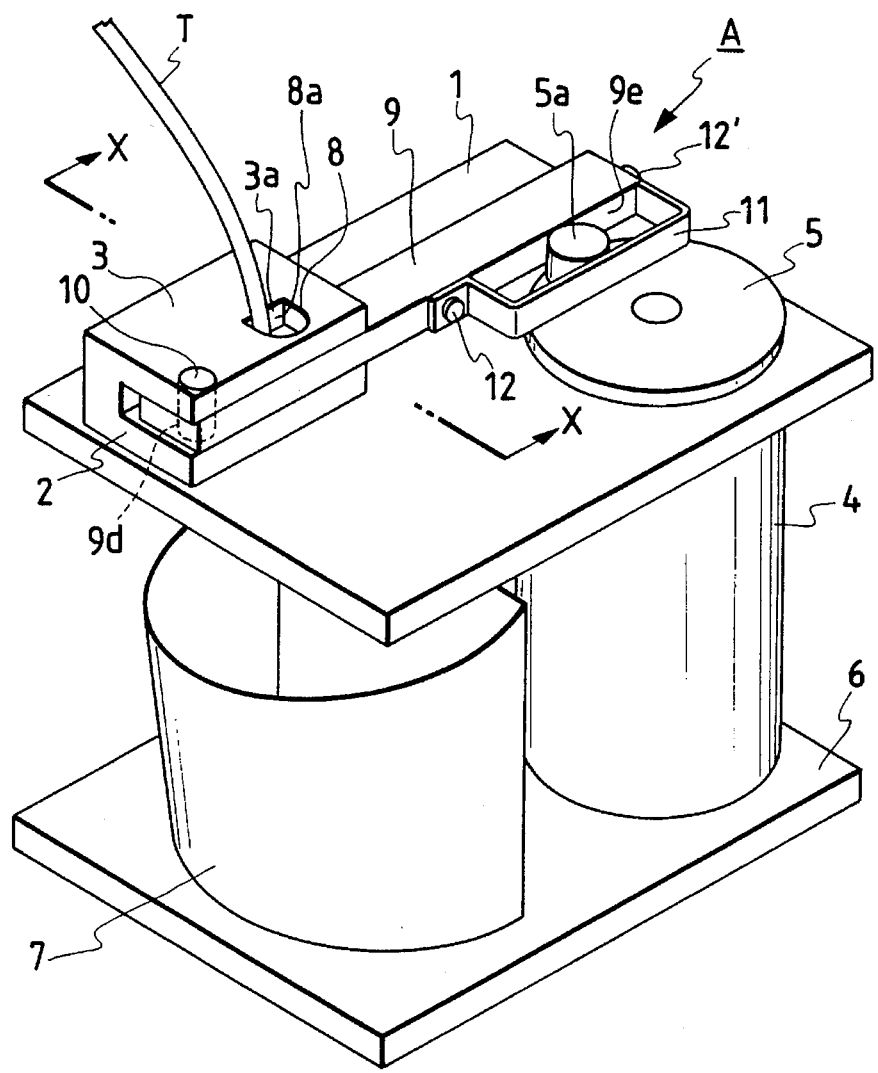
FIG. 1 is a perspective view of a terminal carrier chipper, which is an embodiment of the invention.

FIG. 1 is a perspective view of a terminal carrier chipper A, which is an embodiment of the invention. The terminal carrier chipper A includes: a fixed blade 3 disposed on one end portion of a frame 1 through a guide plate 2; and a disc cam 5 that is driven by a motor 4 disposed on the other end portion thereof. The frame 1 is fixed on a base board 6. Reference numeral 7 designates a chip box for receiving terminal carrier chips.

The fixed blade 3 has a U-shaped terminal carrier insertion hole 8. A blade edge 3a for chipping a terminal carrier is formed on one wall 8a of the hole. On one end of the fixed blade 3 is a support shaft 10 that stands upright between the guide plate 2 and the fixed blade 3. The support shaft 10 serves as a fulcrum of a moving blade lever 9.

Figure 2:
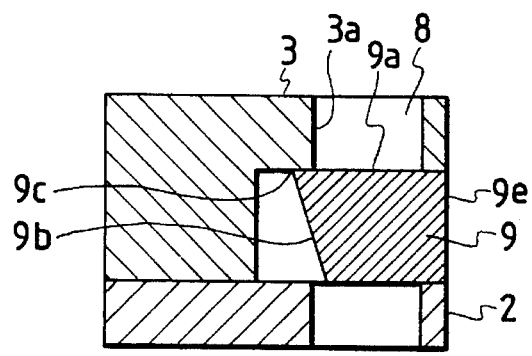
FIG. 2 is a sectional view taken along a line II—II of FIG. 1.

As shown in FIG. 2, the moving blade lever 9 is formed of a special steel bar whose section is trapezoidal and has a polished blade edge 9c that is a corner between an upper surface 9a and a blade edge surface 9b. On one end of the moving blade lever 9 is a shaft hole 9d to be fitted with the support shaft 10. On the other end thereof is a cam guide 11 formed by bending a steel plate. The cam guide 11 is mounted on the moving blade lever 9 with screws 12, 12'.

A cylindrically formed cam projection 5a is disposed on a peripheral portion of the disc cam 5, so that the rotation of the disc cam 5 that is driven by the motor 4 can slide between the cam guide 11 and a side surface 9e of the moving blade lever 9. On the other hand, the moving blade lever 9 is designed to oscillate around the support shaft 10 between the fixed blade 3 and the guide plate 2 in association with the sliding of the cam projection 5a. The blade edge 3a of the fixed blade 3 and the blade edge 9c of the moving blade lever 9 cut a terminal carrier T that is introduced via the carrier insertion hole 8 intermittently into chips, which are dropped and received by a chip box 7.

The above-described terminal carrier chipper A is designed to chip a terminal carrier by converting the rotational movement of the motor 4 into the oscillation of the moving blade lever 9 around the support shaft 10 by the action of the cam projection 5a disposed on the disc cam 5 and the cam guide 11 of the moving blade lever 9. Therefore, unlike the reciprocating movement of the moving blade in the conventional terminal carrier chipper, the terminal carrier chipper of the invention produces extremely small vibration and noise, thereby allowing terminal carriers to be chipped smoothly.

Figure 3:
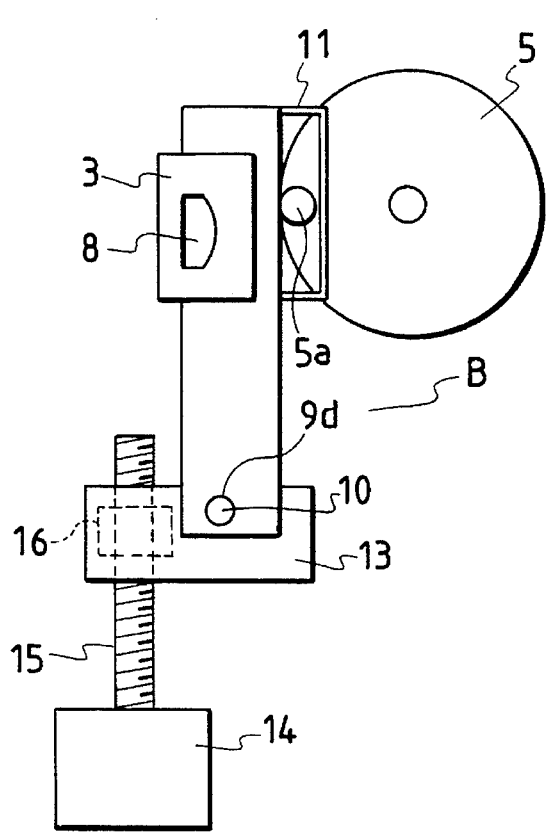
FIG. 3 is a schematic plan view of a terminal carrier chipper, which is another embodiment of the invention.

A terminal carrier chipper B shown in FIG. 3, which is another embodiment of the invention, will be described next.

The terminal carrier chipper B is designed so that the support shaft 10 is mounted on a moving blade lever support stand 13 that is movable, instead of being mounted on the fixed blade 3 or the frame 1, so that the position at which the blade edge 3a of the fixed blade 3 contacts the blade edge 9c of the moving blade lever 9 in the terminal carrier chipper A can be changed.

The moving blade lever support stand 13 has a ball nut 16 that is driven by a ball screw 15 rotated by a servomotor 14. The moving blade lever support stand 13 can move to and from in the axial direction of the ball screw 15 in association with the rotation of the servomotor 14. The other structural members of the terminal carrier chipper B are the same as those of the terminal carrier chipper A.

Figure 4:
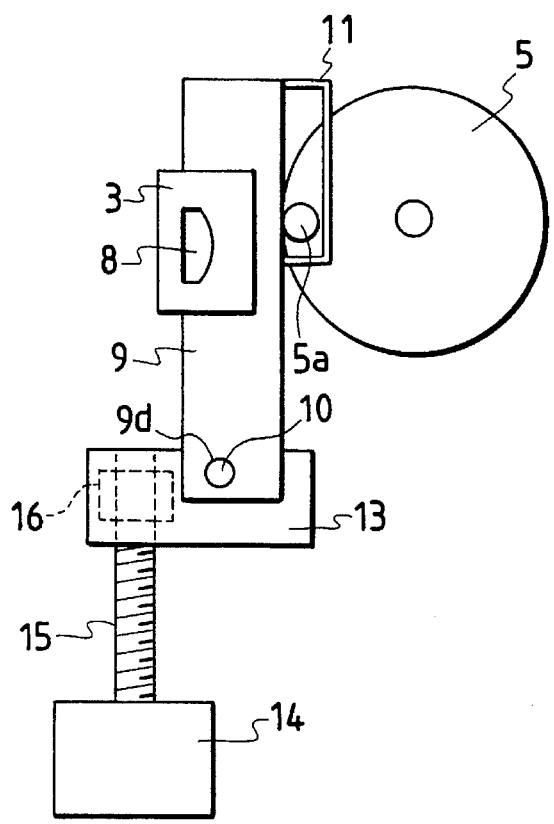
FIG. 4 is a diagram illustrative of a state in which moving blade lever supporting board has been moved.

In the terminal carrier chipper B, e.g., as shown in FIG. 4, the moving blade lever support stand 13 is caused to move closure to and further from the fixed blade 3 by rotating the servomotor 14, so that the position at which the blade edge 9c of the moving blade lever 9 contacts the blade edge 3a of the fixed blade 3 can be changed easily.

Therefore, when a part of the blade edge 9c of the moving blade lever 9 is worn, the servomotor 14 is rotated immediately. This causes the moving blade lever support stand 13 to move so that a sharp portion of the blade edge 9c of the moving blade lever 9 is adjacent the fixed blade 3. As a result, the moving blade lever 9 can be used for a longer period of time without being replaced by a new one, thereby ensuring a long life of the moving blade lever 9 and improving the rate of operation of the terminal carrier chipper.

A modified profile of the moving blade lever, which is still another embodiment, will be described.

Figure 5:
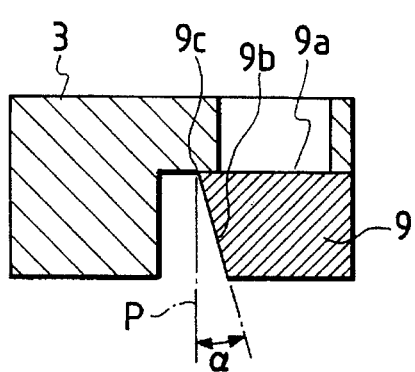
FIG. 5 is a sectional view showing a profile of a blade edge of a moving blade lever of FIG. 1.

FIG. 5 is a sectional view showing a state in which the moving blade lever 9 whose section is trapezoidal move towards and away from the fixed blade 3 forming the terminal carrier chippers A and B. The blade edge surface 9b of the moving blade lever 9 is a sharp surface with an inclination forming an angle α relative to a plane p that is perpendicular to the upper surface 9a of the moving blade lever 9.

Figure 6:
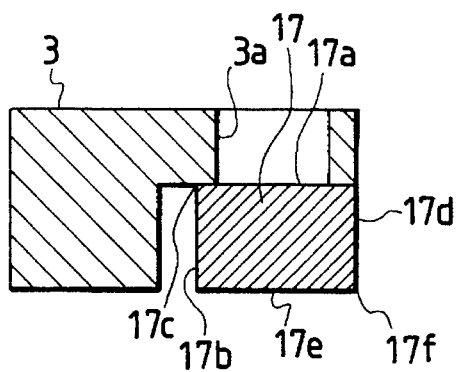
FIG. 6 is a sectional view showing a profile of another example of moving blade lever.

On the other hand, FIG. 6 shows an embodiment using a moving blade lever 17 whose sectional profile is rectangular.

A blade edge surface 17b of the moving blade lever 17 is formed substantially at right angles to an upper surface 17a of the moving blade lever 17. A blade edge 17c is formed as a corner between the upper surface 17a and the blade edge surface 17b which are substantially at right angles to each other. Further, a blade edge 17f is also formed at a corner between a side surface 17d opposite to the blade edge surface 17b and a bottom surface 17e. That is, the moving blade lever 17 has two blade edges 17c and 17f on both sides interposing the shaft hole thereof 17g.

When the blade edge 17c is worn, the moving blade lever 17 is inverted so that the blade edge 17f is adjacent the blade edge 3a of the fixed blade. To do this, the cam guide 11 is removed from the side surface 17d of the moving blade lever 17 and then mounted on the blade edge surface 17b. To allow this operation to be done, the moving blade lever 17 has a screw hole 18 corresponding to the screw 12 not only on the side surface 17d but also on the blade edge surface 17b.

Since the blade edges are formed substantially at right angles to the moving blade lever 17, the blade edges on both surfaces can be used by inverting the moving blade lever 17, thereby contributing to doubling the life of moving blade lever.

According to the invention, terminal carriers are chipped by causing the moving blade lever to oscillate around the support shaft thereof relative to the fixed blade. Therefore, the chipper of the invention is less vibrating and noisy, small and simple in structure, and easy to maintain, unlike the conventional chipper that is based on the reciprocating movement of the moving blade.

Further, by mounting the support shaft of the moving blade lever on the moving blade lever support stand that is movable relative to the fixed blade, the position at which the blade edge of the moving blade lever nears and leaves the fixed blade can be changed at any time, thereby allowing the entire part of the blade edge of the moving blade lever to be used effectively. As a result, the life of the blade edge can be extended to a significant degree and the rate of operation of the terminal carrier chipper can be improved as well.

Still further, by arranging a second similar blade edge on a surface opposite to the surface having a first blade edge while forming the moving blade lever whose section is rectangular, the second blade edge can be used by inverting the moving blade lever when the first blade edge is worn. This provides the advantage of doubling the durability of the blade edge.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A terminal carrier chipper, comprising:

a fixed blade member having a cutting edge (3);

a moving blade lever (9) movable relative to said fixed blade member (3) and having a blade edge (9c) extending in a longitudinal direction;

support means for supporting said moving blade lever, said support means including a supporting shaft on which said movable blade lever is pivotably disposed;

a cam means (5, 5a, 11, 12) for pivoting said moving blade lever (9) about said support shaft (10) by rotating a cam (5, 5a) in contact with a cam guide (11, 12) arranged on the moving blade lever (9) in such a manner that at least a cutting portion of said blade edge (9c) of the moving blade lever (9) oscillates toward and away from the fixed blade member (3); and means for moving said support means, and attendantly said moving blade lever, in said longitudinal direction such that a different portion of said blade edge can be positioned adjacent said cutting edge so as to act as said cutting portion.

2. A terminal carrier chipper according to claim 1, wherein a blade edge surface (9b) of the moving blade lever (9) is formed at an acute angle to an upper surface (9a) of the moving blade lever (9).

3. A terminal carrier chipper according to claim 1, wherein the blade edge (9c) of the moving blade lever (9) includes a corner defined by adjacent surfaces.

4. A terminal carrier chipper according to claim 1, wherein a blade edge surface (17b) of the moving blade lever (17) is formed substantially at right angles to an upper surface (17a) of the moving blade lever (17).

5. A terminal carrier chipper for chipping a terminal carrier that carries a plurality of terminals, comprising:

a fixed blade having a first cutting edge;

a movable blade having a pair of second cutting edges and being movable relative to said fixed blade;

cam means for pivoting said movable blade relative to said fixed blade such that one of said second cutting edges cooperates with said first cutting edge to chip said terminal carrier, wherein said movable blade is invertible such that the other one of said second cutting edges is cooperable with said first cutting edge to chip said terminal carrier, said cam means including a rotatable disc cam having a cam protection extending therefrom and a cam guide secured to said movable blade and engaged by said cam projection, wherein rotation of said cam projection causes said cam guide to urge said movable blade towards and away from said fixed blade; and wherein said cam guide is alternatively securable to opposite sides of said movable blade depending on which of said second cutting edges is used to chip said terminal carrier.

* * * * *